US008876185B1

(12) United States Patent  
Edwards, Sr.

(10) Patent No.: US 8,876,185 B1
(45) Date of Patent: Nov. 4, 2014

(54) MAGNETICALLY ADJUSTABLE SUN VISOR ASSEMBLY

(71) Applicant: Roby Edwards, Sr., St. Louis, MO (US)

(72) Inventor: Roby Edwards, Sr., St. Louis, MO (US)

( * ) Notice: Subject to any disclaimer, the term of this patent is extended or adjusted under 35 U.S.C. 154(b) by 0 days.

(21) Appl. No.: 13/934,777

(22) Filed: Jul. 3, 2013

(51) Int. Cl.
*B60J 3/02* (2006.01)

(52) U.S. Cl.
CPC .................................. *B60J 3/0204* (2013.01)
USPC ................... 296/97.8; 296/97.6; 296/97.11

(58) Field of Classification Search
CPC ........... B60J 3/0208; B60J 3/00; B60J 3/0265
USPC .................. 296/97.6, 97.11, 97.1, 97.5, 97.8
See application file for complete search history.

(56) References Cited

U.S. PATENT DOCUMENTS

| | | | | | |
|---|---|---|---|---|---|
| 2,776,859 | A | * | 1/1957 | Delano | 296/97.6 |
| 3,085,827 | A | * | 4/1963 | Cederberg et al. | 296/97.6 |
| 4,792,170 | A | * | 12/1988 | Gipson et al. | 294/31.2 |
| 4,861,091 | A | * | 8/1989 | Wallen | 296/97.6 |
| 5,040,841 | A | * | 8/1991 | Yang | 296/97.6 |
| 5,044,685 | A | * | 9/1991 | Yang | 296/97.6 |
| 5,061,003 | A | * | 10/1991 | Gabas | 296/97.1 |
| 5,259,657 | A | * | 11/1993 | Arendt et al. | 296/97.6 |
| 5,445,427 | A | | 8/1995 | Vandagriff | |
| D361,970 | S | | 9/1995 | Zetterlund | |
| 5,455,427 | A | * | 10/1995 | Lepselter et al. | 250/492.23 |
| 5,466,029 | A | * | 11/1995 | Zetterlund | 296/97.6 |
| 5,470,122 | A | | 11/1995 | Feng | |
| 5,472,255 | A | * | 12/1995 | Moore | 296/97.6 |
| 5,749,618 | A | | 5/1998 | Jones | |
| 5,810,419 | A | * | 9/1998 | Lam | 296/97.1 |
| 5,810,421 | A | * | 9/1998 | Kalkman et al. | 296/97.6 |
| D400,483 | S | | 11/1998 | Lebron-Guzman | |
| 5,921,607 | A | * | 7/1999 | Brooks et al. | 296/97.6 |
| 6,012,758 | A | | 1/2000 | Fisher | |
| 6,139,084 | A | | 10/2000 | Miles | |
| 6,176,539 | B1 | | 1/2001 | Westerman | |
| 6,189,947 | B1 | * | 2/2001 | Annan | 296/97.6 |
| 6,325,443 | B1 | * | 12/2001 | Sanchez | 296/97.6 |
| 6,406,086 | B2 | * | 6/2002 | Bauer et al. | 296/97.6 |
| 6,412,520 | B1 | * | 7/2002 | Yasumatsu et al. | 138/141 |
| 6,616,209 | B1 | * | 9/2003 | Muyo | 296/97.6 |
| 6,705,661 | B2 | * | 3/2004 | Amirmoini | 296/97.6 |
| 6,899,371 | B1 | * | 5/2005 | Hammond | 296/97.6 |
| 7,011,354 | B1 | * | 3/2006 | Gullickson | 296/97.11 |
| 7,344,176 | B2 | * | 3/2008 | Maharaj | 296/97.6 |
| 7,540,553 | B1 | * | 6/2009 | Mullis | 296/97.8 |
| 8,544,933 | B1 | * | 10/2013 | Fuller | 296/97.6 |
| 2011/0001332 | A1 | * | 1/2011 | Weber | 296/97.6 |
| 2011/0042995 | A1 | * | 2/2011 | Benites | 296/97.11 |
| 2011/0266825 | A1 | * | 11/2011 | Bagioli | 296/97.6 |

* cited by examiner

Primary Examiner — Gregory Blankenship

(57) ABSTRACT

A magnetically adjustable sun visor assembly for providing additional dimension to a vehicle sun visor includes a mounting panel that may be operationally coupled to a vehicle sun visor. A coupler is coupled to the mounting panel so the coupler may be operationally coupled to the vehicle sun visor so the mounting panel is operationally coupled to the vehicle sun visor. A primary panel is operationally coupled to the mounting panel so the primary panel is positionable between an extended position and a stored position. The primary panel is selectively positioned in the extended position to block sunlight for a user. A secondary panel is operationally coupled to the primary panel so the secondary panel is positionable between an extended position and a stored position. The secondary panel is selectively positioned in the extended position to block sunlight for the user.

16 Claims, 6 Drawing Sheets

MAGNETICALLY ADJUSTABLE SUN VISOR ASSEMBLY

BACKGROUND OF THE DISCLOSURE

Field of the Disclosure

The disclosure relates to magnetically adjustable sun visor devices and more particularly pertains to a new magnetically adjustable sun visor device for providing additional dimension to a vehicle sun visor.

SUMMARY OF THE DISCLOSURE

An embodiment of the disclosure meets the needs presented above by generally comprising a mounting panel that may be operationally coupled to a vehicle sun visor. A coupler is coupled to the mounting panel so the coupler may be operationally coupled to the vehicle sun visor so the mounting panel is operationally coupled to the vehicle sun visor. A primary panel is operationally coupled to the mounting panel so the primary panel is positionable between an extended position and a stored position. The primary panel is selectively positioned in the extended position to block sunlight for a user. A secondary panel is operationally coupled to the primary panel so the secondary panel is positionable between an extended position and a stored position. The secondary panel is selectively positioned in the extended position to block sunlight for the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
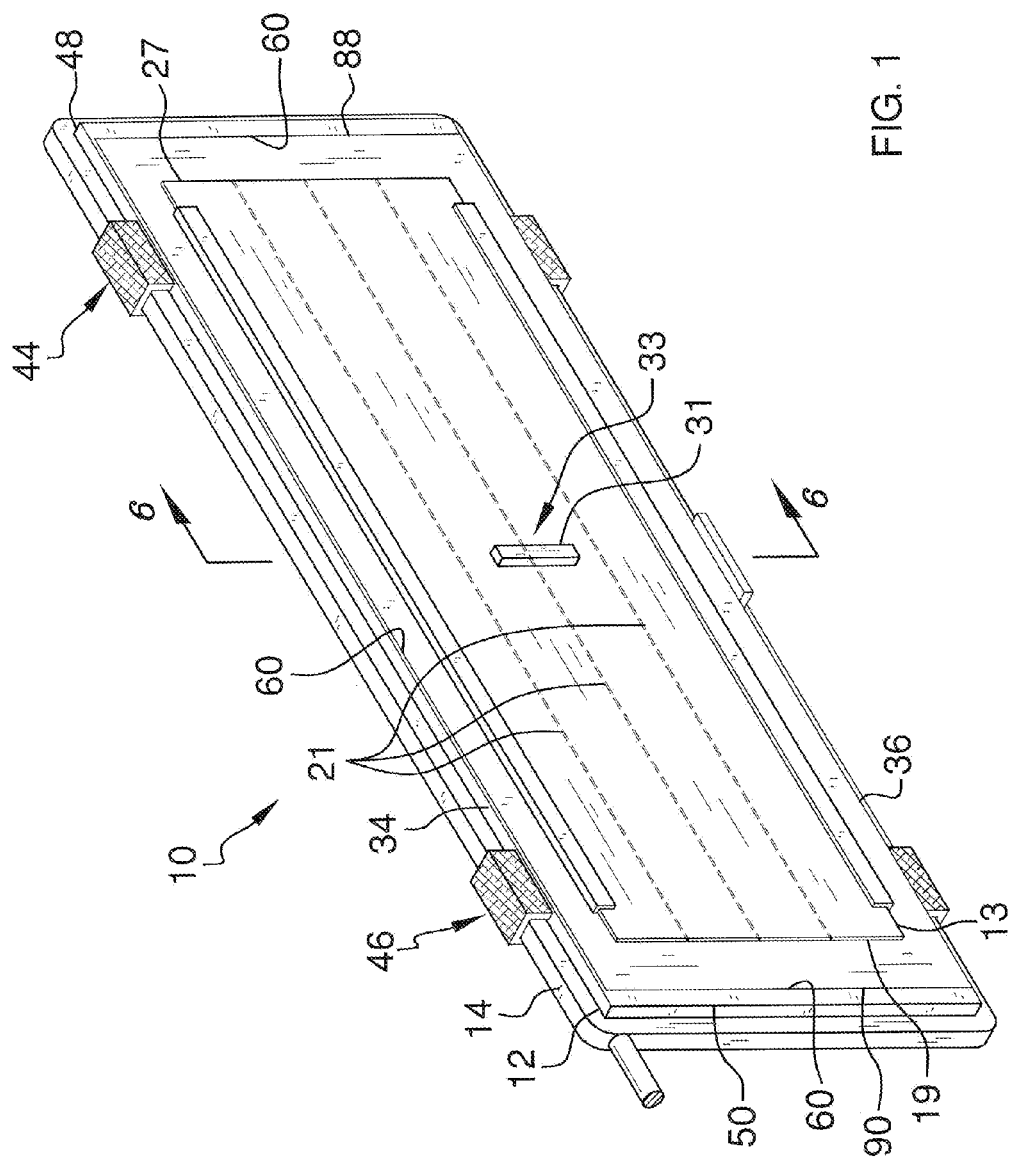
FIG. 1 is a front perspective view of a magnetically adjustable sun visor assembly according to an embodiment of the disclosure.
Figure 2:
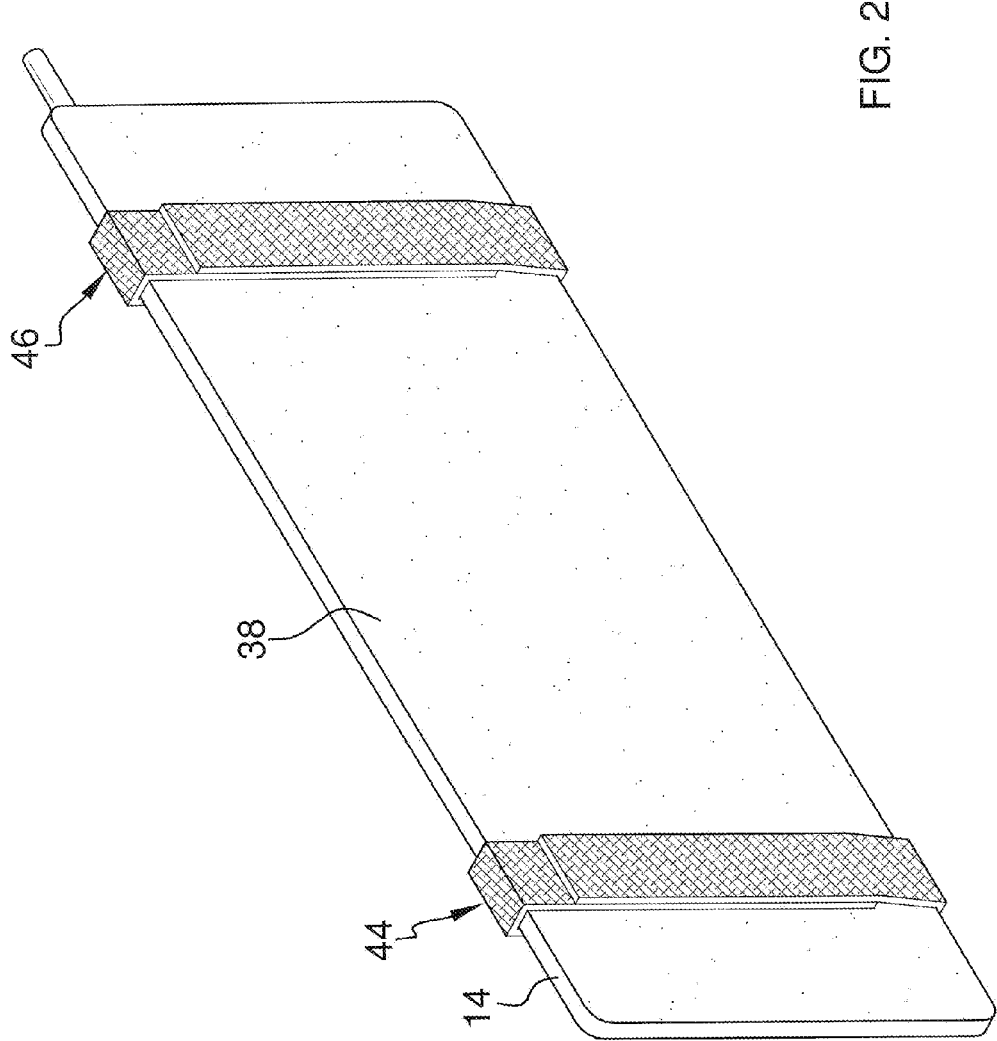
FIG. 2 is a back perspective view of an embodiment of the disclosure.
Figure 3:
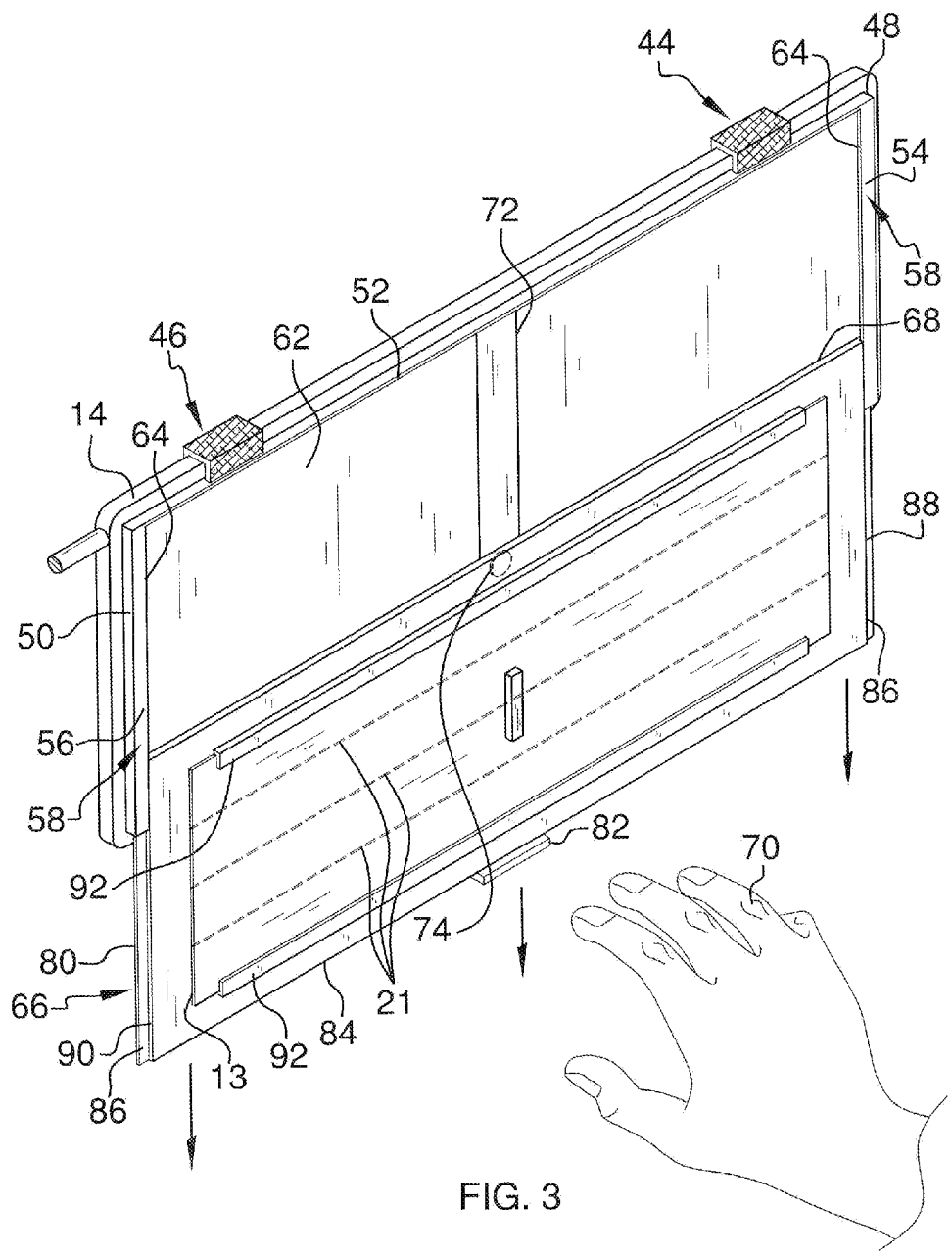
FIG. 3 is a top perspective view of an embodiment of the disclosure.
Figure 4:
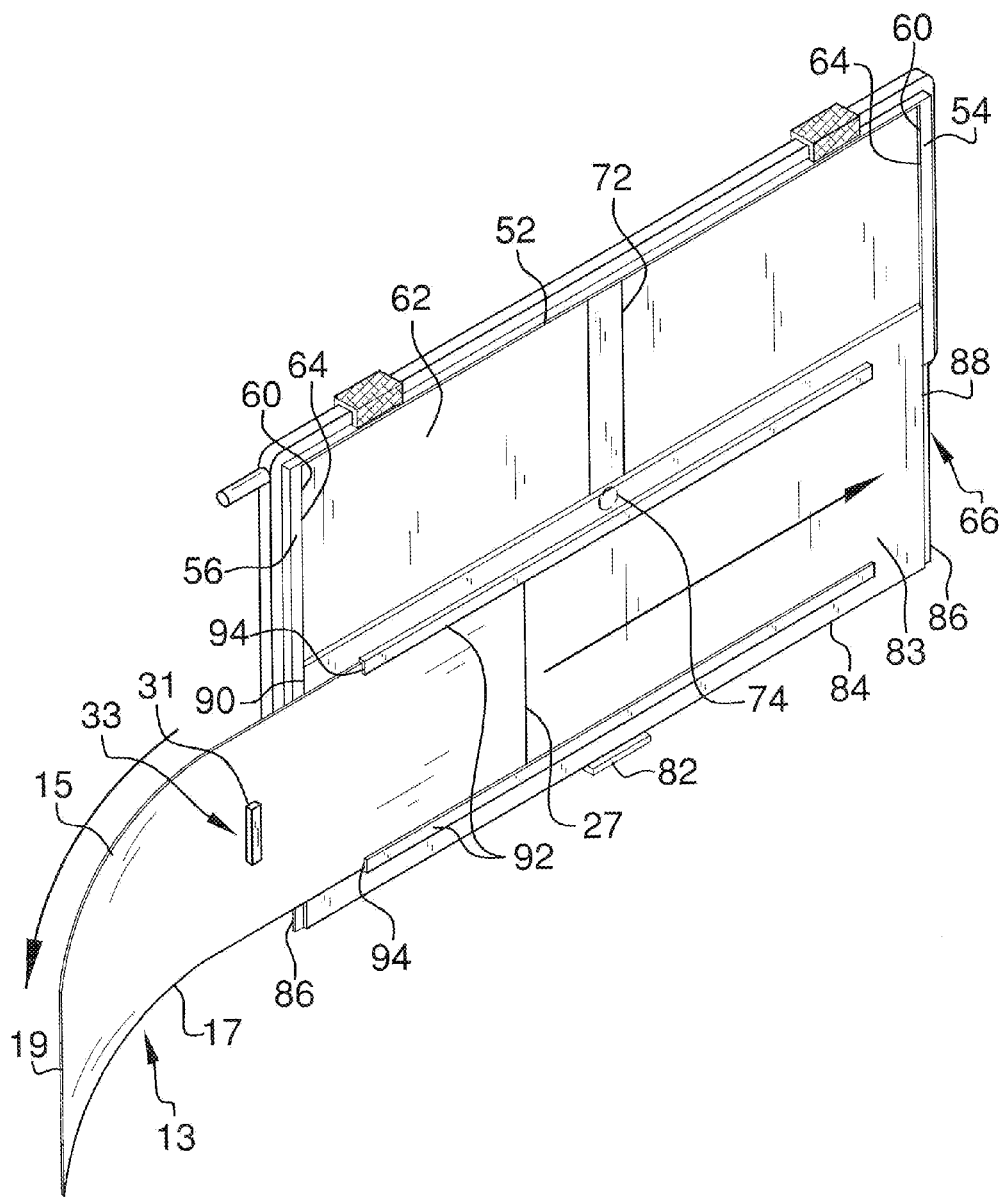
FIG. 4 is a left perspective view of an embodiment of the disclosure.
Figure 5:
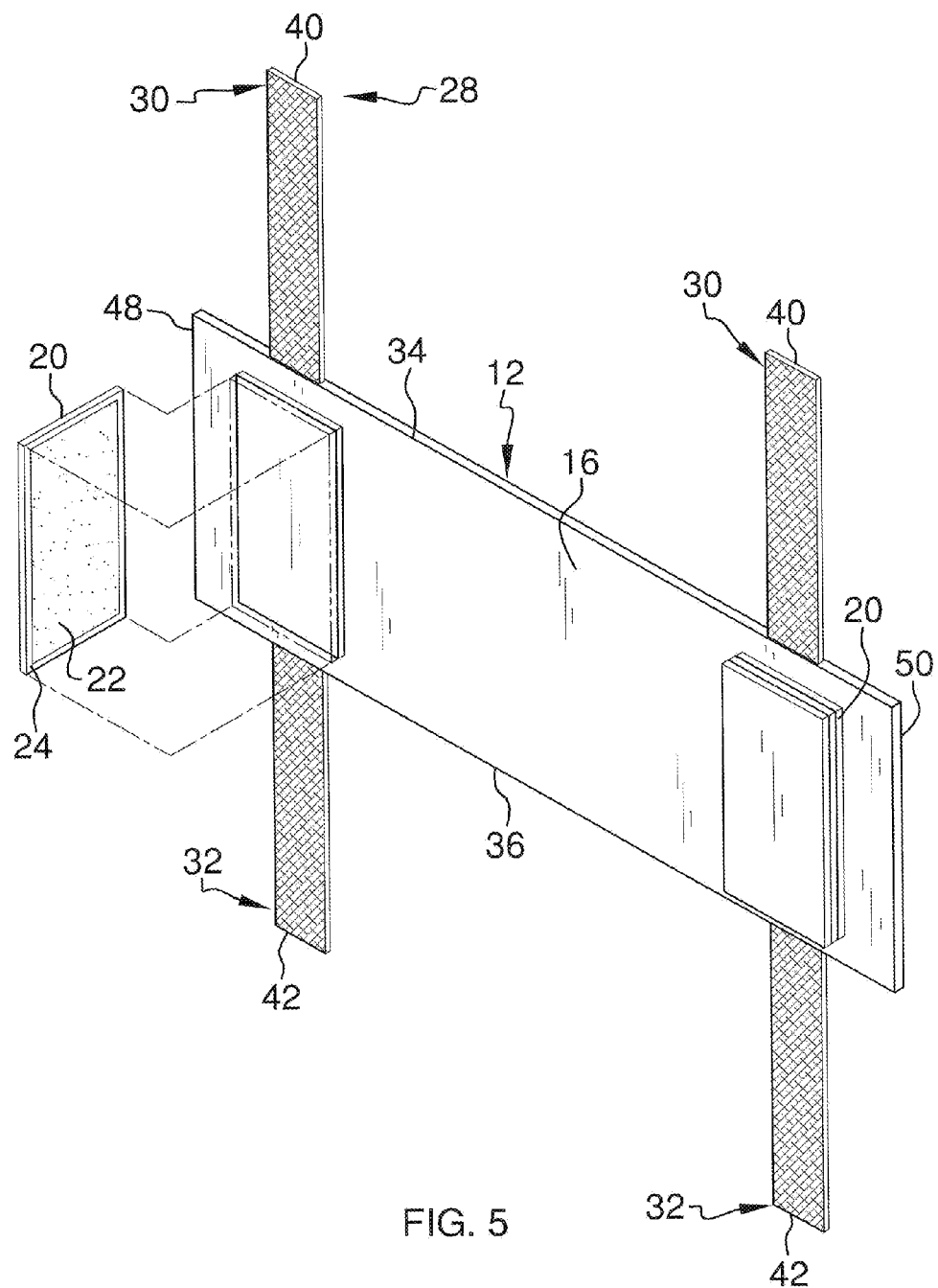
FIG. 5 is a right perspective view of an embodiment of the disclosure.
Figure 6:
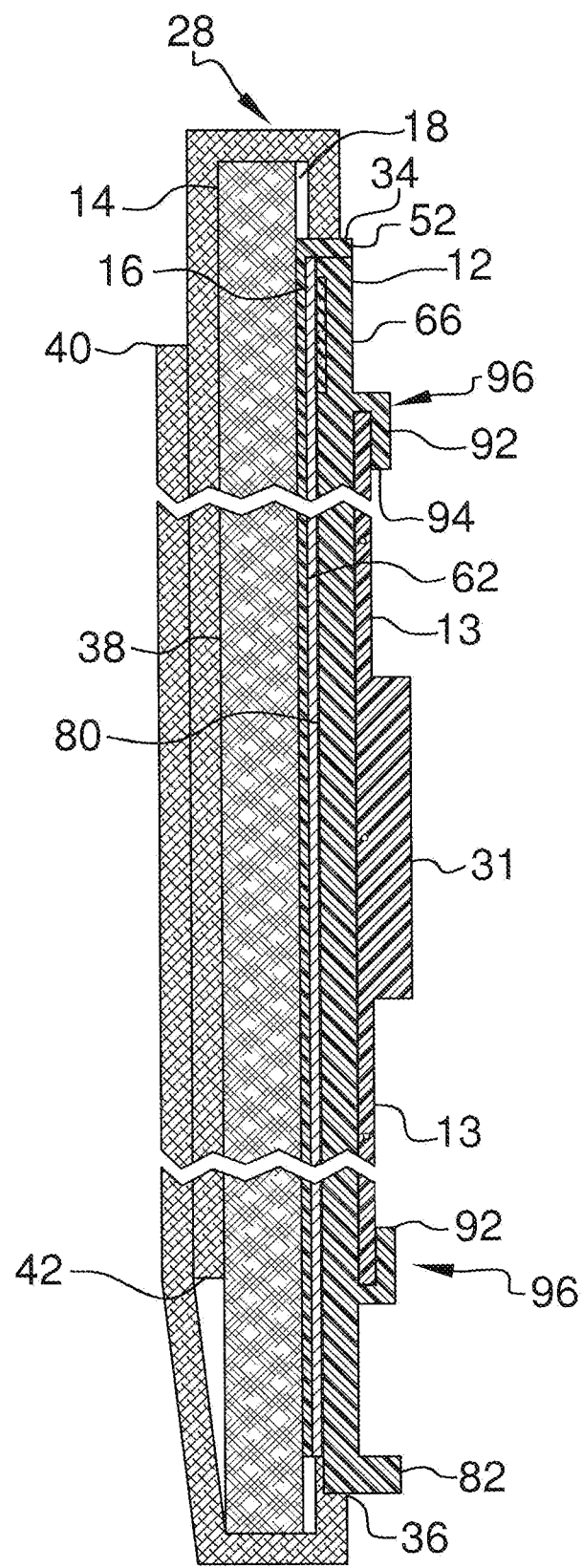
FIG. 6 is a cross sectional view taken along line 6-6 of FIG. 1 of an embodiment of the disclosure.

With reference now to the drawings, and in particular to FIGS. 1 through 6 thereof, a new magnetically adjustable sun visor device embodying the principles and concepts of an embodiment of the disclosure and generally designated by the reference numeral 10 will be described.

As best illustrated in FIGS. 1 through 6, the magnetically adjustable sun visor assembly 10 generally comprises a mounting panel 12 that is positionable on a vehicle sun visor 14 so a back side 16 of the mounting panel 12 abuts a front side 18 of the vehicle sun visor 14. The vehicle sun visor 14 may be a vehicle sun visor 14 of any conventional design. Additionally, the mounting panel 12 may have a length between 25 cm and 30 cm and a height between 12 cm and 18 cm. A plurality of backing blocks 20 is provided. An adhesive layer 22 is coextensively coupled to a back side 24 of each of the plurality of backing blocks 20. Moreover, a selected number of the plurality of backing blocks 20 may be adhered to the back side 16 of the mounting panel 12. The plurality of backing blocks 20 spaces the mounting panel 12 away from a mirror 26 positioned on the vehicle sun visor 14.

A coupler 28 is coupled to the mounting panel 12. The coupler 28 is one of a pair of the couplers 28. Moreover, a first one 30 and a second one 32 of the pair of couplers is each coupled to and extends away from an associated one of a top edge 34 and a bottom edge 36 of the mounting panel 12. Each of the first 30 and second 32 couplers comprise complementary hook and loop fasteners.

The first 30 and second 32 couplers are wrapped around a back side 38 of the vehicle sun visor 14 so a free end 40 of the first coupler 30 engages a free end 42 of the second coupler 32. The first 30 and second 32 couplers retain the mounting panel 12 on the front side 18 of the vehicle sun visor 14. Additionally, the first 30 and second 32 couplers are one of a pair of sets of the first 30 and second 32 couplers. A first set 44 and a second set 46 of the pair first 30 and second 32 couplers are each positioned proximate an associated one of a first end 48 and a second end 50 of the mounting panel 12. A top side 52, a first lateral side 54 and a second lateral side 56 of a forward portion 58 of an outer edge 60 of the mounting panel 12 extends a distance between 3 mm and 6.5 mm forwardly from a front side 62 of the mounting panel 12. A pair of grooves 64 each extends into and is coextensive with an associated one of the first 54 and second 56 lateral sides of the forward portion 58 of the outer edge 60 of the mounting panel 12 proximate the front side 62 of the mounting panel 12.

A primary panel 66 is operationally coupled to the mounting panel 12. The primary panel 66 is positionable in a stored position so a top edge 68 of the primary panel 66 abuts the top side 52 of the forward portion 58 of the outer edge 60 of the mounting panel 12. Moreover, the primary panel 66 is positionable in the extended position so the primary panel 66 is slid downwardly on the mounting panel 12. In the extended position the primary panel 66 is positioned beneath the vehicle sun visor 14 to block sunlight for a user 70. Lastly, the primary panel 66 may have a length between 25 cm and 30 cm and a height between 12 cm and 18 cm.

A centrally positioned strip 72 is coupled to the front side 62 of the mounting panel 12 so the centrally positioned strip 72 extends between the top edge 34 and the bottom edge 36 of the mounting panel 12. The centrally positioned strip 72 may be comprised of a magnetic and rigid material such as steel of other similar material. A magnet 74 is coupled to a back side 80 of the primary panel 66. The magnet 74 magnetically engages the centrally positioned strip 72 so the primary panel 66 is retained at a selected point in the extended position. A handle 82 is coupled to a front side 83 of the primary panel 66 proximate a bottom edge 84 of the primary panel 66. The handle 82 is configured to be gripped by the user 70 so the user 70 may manipulate the primary panel 66 between the stored and extended positions.

A pair of tabs 86 are each coupled to and extend away from an associated one of a first end 88 and a second end 90 of the primary panel 66. The pair of tabs 86 on the primary panel 66 each slidably engage an associated one of the pair of grooves 64 on the mounting panel 12 so the primary panel 66 is slidably coupled to the mounting panel 12. Continuing, an L-shaped bracket 92 is coupled to and extends forwardly from the front side 84 of the primary panel 66. A space 94 is defined between a forward portion 96 of the L-shaped bracket 92 and the front side 83 of the primary panel 66. Moreover, the L-shaped bracket 92 is one of a pair of the L-shaped brackets 92 each positioned proximate an associated one of the top edge 68 and the bottom edge 84 of the primary panel 66.

A secondary panel 13 is positioned on the front side 84 of the primary panel 66. A top edge 15 and a bottom edge 17 of the secondary panel 13 is each movably positioned within an associated one of the spaces 94 between the forward portion 96 of the pair of L-shaped brackets 92 and the front side 83 of the primary panel 66. The secondary panel 13 is slidably coupled to the primary panel 66 so the secondary panel 13 is positionable in an extended position. In the extended position a first end 19 of the secondary panel 13 is extendable a selected distance away from the first end 88 of the primary panel 66. The secondary panel 13 is positionable in a stored position so the secondary panel 13 is coextensive with the primary panel 66. Lastly, the secondary panel 13 may have a length between 20 cm and 25 cm and a height between 10 cm and 16 cm.

The secondary panel 13 is comprised of a flexible material. A plurality of resilient members 21 is positioned between a front side 23 and a back side 25 of the secondary panel 13. Moreover, each of the plurality of resilient members 21 extends between a first end 27 and a second end 29 of the secondary panel 13. The plurality of resilient members 21 allows the secondary panel 13 to be deformed such that the resilient members 21 retain the secondary panel 13 in the deformed position. A handle 31 is coupled to a middle 33 of the front side 23 of the secondary panel 13. The handle 31 is configured to by gripped by the user 70 so the user 70 may manipulate the secondary panel 13 between the stored and extended positions.

In use, the user 70 positions the primary panel 66 at a selected point in the extended position. The primary panel 66 provides the user 70 with an additional amount of shade if the vehicle sun visor 14 does not provide adequate shade when the vehicle sun visor 14 is positioned forwardly from the user 70. The vehicle sun visor 14 may be positioned laterally from the user 70 to provide shade. The user 70 positions the secondary panel 13 at a selected point in the extended position to provide additional shade. The user 70 additionally selectively deforms the secondary panel 13 to maximize the additional shade the secondary panel 13 provides in addition to the shade provided by the vehicle sun visor 14. The primary 66 and secondary 13 panels may be used in simultaneously or independently.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure,

I claim:

1. A magnetically adjustable sun visor assembly for providing additional dimension to the vehicle sun visor, said assembly comprising:
   a mounting panel configured to be operationally coupled to a vehicle sun visor;
   a coupler coupled to said mounting panel wherein said coupler is configured to be operationally coupled to the vehicle sun visor wherein said mounting panel is operationally coupled to the vehicle sun visor;
   a primary panel operationally coupled to said mounting panel wherein said primary panel is positionable between an extended position and a stored position, said primary panel being selectively positioned in said extended position to block sunlight for a user;
   a secondary panel operationally coupled to said primary panel wherein said secondary panel is positionable between an extended position and a stored position, said secondary panel being selectively positioned in said extended position to block sunlight for the user, said secondary panel being comprised of a flexible material wherein said secondary panel is deformable; and
   a plurality of resilient members positioned between a front side and a back side of said secondary panel, each of said resilient members extending between a first end and a second end of said secondary panel allowing said secondary panel to be deformed.

2. The assembly according to claim 1, further comprising said mounting panel being positionable on the vehicle sun visor wherein a back side of said mounting panel abuts a front side of the vehicle sun visor.

3. The assembly according to claim 1, further comprising said coupler being one of a pair of said couplers.

4. The assembly according to claim 3, further comprising a first one and a second one of said pair of couplers each being coupled to and extending away from an associated one of a top edge and a bottom edge of said mounting panel.

5. The assembly according to claim 4, further comprising said first and second couplers being wrapped around a back side of the vehicle sun visor wherein a free end of said first coupler engages a free end of said second coupler wherein said mounting panel is retained on a front side of the vehicle sun visor.

6. The assembly according to claim 5, further comprising said first and second couplers being one of a pair of sets of said first and second couplers wherein a first set and a second set of said first and said second couplers is each positioned proximate an associated one of a first end and a second end of said mounting panel.

7. The assembly according to claim 1, further comprising a top side, a first lateral side and a second lateral side of forward portion of an outer edge of said mounting panel extending forwardly from a front side of said mounting panel.

8. The assembly according to claim 7, further comprising a pair of grooves each extending into and being coextensive with an associated one of said first and second lateral sides of said forward portion of said outer edge of said mounting panel proximate said front side of said mounting panel.

9. The assembly according to claim 1, further comprising a pair of tabs each coupled to and extending away from an associated one of a first end and a second end of said primary panel.

10. The assembly according to claim 9, further comprising said pair of tabs on said primary panel each slidably engaging an associated one of a pair of grooves on said mounting panel wherein said primary panel is slidably coupled to said mounting panel.

11. The assembly according to claim 1, further comprising said primary panel being positionable in said stored position wherein a top edge of said primary panel abuts a top side of a forward portion of an outer edge of said mounting panel, said primary panel being positionable in said extended position wherein said primary panel is slid downwardly on said mounting panel wherein said primary panel is positioned beneath the vehicle sun visor.

12. The assembly according to claim 1, further comprising an L-shaped bracket coupled to and extending forwardly from a front side of said primary panel wherein a space is defined between a forward portion of said L-shaped bracket and said front side of said primary panel.

13. The assembly according to claim 12, further comprising said L-shaped bracket being one of a pair of said L-shaped brackets each positioned proximate an associated one of a top edge and a bottom edge of said primary panel.

14. The assembly according to claim 1, further comprising said secondary panel being positioned on said primary panel wherein a top edge and a bottom edge of said secondary panel is each movably positioned within an associated one of a space between a forward portion of a pair of L-shaped brackets and a front side of said primary panel wherein said secondary panel is slidably coupled to said primary panel.

15. The assembly according to claim 1, further comprising said secondary panel being positionable in said extended position wherein said first end of said secondary panel is extendable away from a first end of said primary panel, said secondary panel being positionable in said stored position wherein said secondary panel is coextensive with said primary panel.

16. A magnetically adjustable sun visor assembly for providing additional dimension to a vehicle sun visor, said assembly comprising:
a mounting panel being positionable on the vehicle sun visor wherein a back side of said mounting panel abuts a front side of the vehicle sun visor, a top side, a first lateral side and a second lateral side of forward portion of an outer edge of said mounting panel extending forwardly from a front side of said mounting panel;
a coupler coupled to said mounting panel, said coupler being one of a pair of said couplers, a first one and a second one of said pair of couplers each being coupled to and extending away from an associated one of a top edge and a bottom edge of said mounting panel, said first and second couplers being wrapped around a back side of the vehicle sun visor wherein a free end of said first coupler engages a free end of said second coupler wherein said mounting panel is retained on the front side of the vehicle sun visor, said first and second couplers being one of a pair of sets of said first and second couplers wherein a first set and a second set of said first and said second couplers is each positioned proximate an associated one of a first end and a second end of said mounting panel;
a pair of grooves each extending into and being coextensive with an associated one of said first and second lateral sides of said forward portion of said outer edge of said mounting panel proximate said front side of said mounting panel;
a primary panel operationally coupled to said mounting panel wherein said primary panel is positionable in a stored position wherein a top edge of said primary panel abuts said top side of said forward portion of said outer edge of said mounting panel, said primary panel being positionable in said extended position wherein said primary panel is slid downwardly on said mounting panel wherein said primary panel is positioned beneath the vehicle sun visor to block sunlight for a user;
a pair of tabs each coupled to and extending away from an associated one of a first end and a second end of said primary panel, said pair of tabs on said primary panel each slidably engaging an associated one of said pair of grooves on said mounting panel wherein said primary panel is slidably coupled to said mounting panel;
an L-shaped bracket coupled to and extending forwardly from a front side of said primary panel wherein a space is defined between a forward portion of said L-shaped bracket and said front side of said primary panel, said L-shaped bracket being one of a pair of said L-shaped brackets each positioned proximate an associated one of said top edge and a bottom edge of said primary panel;
a secondary panel being positioned on said primary panel wherein a top edge and a bottom edge of said secondary panel is each movably positioned within an associated one of said spaces between said forward portion of said pair of L-shaped brackets and said front side of said primary panel wherein said secondary panel is slidably coupled to said primary panel, said secondary panel being positionable in an extended position wherein said first end of said secondary panel is extendable away from said first end of said primary panel, said secondary panel being positionable in said stored position wherein said secondary panel is coextensive with said primary panel, said secondary panel being comprised of a flexible material wherein said secondary panel is deformable; and
a plurality of resilient members positioned between a front side and a back side of said secondary panel, each of said resilient members extending between said first end and a second end of said secondary panel allowing said secondary panel to be deformed.

* * * * *